United States Patent [19]

Stapp et al.

[11] 4,064,115

[45] Dec. 20, 1977

[54] BROMINATION OF POLY(ARYLENE SULFIDES)

[75] Inventors: Paul R. Stapp; Donnie G. Brady, both of Bartlesville, Okla.

[73] Assignee: Phillips Petroleum Company, Bartlesville, Okla.

[21] Appl. No.: 711,026

[22] Filed: Aug. 2, 1976

[51] Int. Cl.² .................. C08G 75/14; C08G 75/16
[52] U.S. Cl. ................. 260/79.1; 260/45.7 S; 260/79; 260/884
[58] Field of Search ................. 260/79, 79.1

[56] References Cited

U.S. PATENT DOCUMENTS

| | | | |
|---|---|---|---|
| 2,907,792 | 10/1959 | McIntyre | 260/523 |
| 3,214,481 | 10/1965 | Heinemann et al. | 260/659 |
| 3,273,964 | 9/1966 | De Rosset | 23/216 |
| 3,324,087 | 6/1967 | Smith et al. | 260/79 |
| 3,354,129 | 11/1967 | Edmonds et al. | 260/79 |
| 3,504,022 | 3/1970 | Bresson | 260/524 |
| 3,524,835 | 8/1970 | Edmonds et al. | 260/79.1 |
| 3,591,645 | 7/1971 | Selwitz | 260/650 |
| 3,717,620 | 2/1973 | Rohlfing | 260/79.1 |
| 3,723,510 | 3/1973 | Ono et al. | 260/497 R |
| 3,725,362 | 4/1973 | Walker | 260/79.1 |

*Primary Examiner*—Ronald W. Griffin

[57] ABSTRACT

Arylene sulfide polymers are brominated by contacting the polymer with a free oxygen-containing gas in the presence of a catalyst system comprising a copper ion, an alkali metal ion, and a bromide ion under reaction conditions which form a brominated arylene sulfide polymer. The brominated polymer has reduced flammability characteristics and is useful as a flame retardant additive as well as an ultraviolet stabilizer for polymers.

8 Claims, No Drawings

BROMINATION OF POLY(ARYLENE SULFIDES)

This invention relates to the production of aromatic sulfide polymers having improved physical properties. In accordance with another aspect, this invention relates to a process for the bromination of arylene sulfide polymers by contacting with an oxygen-containing gas and a catalyst system containing a copper ion, an alkali metal ion, and a bromide ion. In accordance with another aspect, the bromination of arylene sulfide polymers with a free oxygen-containing gas and a catalyst system containing a copper ion, an alkali metal ion, and a bromide ion is carried out in the presence of a diluent having substantial oxidative stability such as carboxylic acids. In accordance with a further aspect, bromination of arylene sulfide polymers such as poly(phenylene sulfide) is carried out by contacting particulate polymer with an oxygen-containing gas in the presence of the above-defined catalyst system, preferably in a diluent having oxidative stability.

Aromatic sulfide polymers ranging in consistency from viscous liquids to crystalline solids are known. While such polymers exhibit desirable properties for many applications, considerable research has been expended to find methods of improving the properties and versatility of arylene sulfide polymers for various applications. The present invention is directed to a process for brominating arylene sulfide polymers to yield a brominated polymeric product having reduced flammability characteristics which has utility as a flame retardant additive as well as an ultraviolet stabilizer.

Accordingly, an object of this invention is to improve the physical properties of poly(arylene sulfide) resins.

A further object of the invention is to provide a process for brominating arylene sulfide polymers.

A further object of the invention is to provide a catalyst system effective for brominating arylene sulfide polymers.

A further object of the invention is to provide a brominated arylene sulfide polymer having reduced flammability characteristics.

A still further object of the invention is to provide a flame retardant additive for various polymers.

Other objects, aspects, and the several advantages of this invention will become apparent to those skilled in the art upon a study of this disclosure and the appended claims.

In accordance with the invention, arylene sulfide polymers are brominated by contacting with a free oxygen-containing gas in the presence of a catalyst system comprising a copper ion, an alkali metal ion, and a bromide ion. In accordance with one embodiment of the invention, arylene sulfide polymers such as poly(phenylene sulfide) are brominated by contacting with an oxygen-containing gas and a catalyst system comprising a copper ion, an alkali metal ion, and a bromide ion in a diluent having oxidative stability under reaction conditions including a temperature, a period of time, and ratios of reactants sufficient to form a brominated arylene sulfide polymer.

In accordance with one preferred embodiment of the invention, the bromination reaction is carried out by contacting particulate polymer with the oxygen-containing gas and the catalyst perferably in a diluent having oxidative stability.

It has been found, according to the invention, that an improved class of poly(arylene sulfide) resins can be obtained by brominating arylene sulfide polymers such as defined hereinbelow. The brominated polymer has reduced flammability characteristics and can be used as a flame retardant additive and/or as an ultraviolet stabilizer for various polymers. It is to be understood that the properties of the polymeric material prepared according to the invention can vary considerably depending on the nature of the starting material, such as molecular weight, melt viscosity, and the like. The length of time and temperature of the bromination can also be used to vary the properties within wide limits, it being understood that even after the mildest treatment, some bromination of the polymer will be achieved.

The poly(arylene sulfides) which are brominated according to the process of the instant invention are normally solid materials which can be represented by the following general formula to broadly describe a typical repeat unit in such polymers:

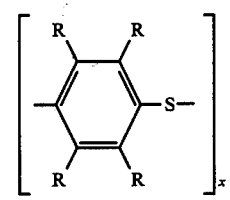

wherein R is selected from the group consisting of hydrogen and alkyl groups of from 1 to 4 carbon atoms such as methyl, ethyl, propyl, butyl, and the like, and wherein $x$ is an integer having a value in the range of about 10 to about 250. The poly(arylene sulfides) can be prepared by any suitable means known in the art. U.S. Pat. No. 3,354,129, Edmonds et al, discloses suitable methods for making such polymers. At the present time, one such suitable polymer is available commercially as Ryton ® A available from Phillips Petroleum Company. Suitable poly(arylene sulfides) can also be characterized in terms of their melt flow behavior, and the melt flow of suitable poly(arylene sulfides) can vary from about 7,000 down to 0, as determined by modified ASTM method, ASTM-D-1238, wherein the temperature is 600° F (316° C), a 0.0825 inch (2.1 mm) orifice is utilized, and wherein a 5 kilogram weight is utilized in the melt flow determination. Generally, the arylene sulfide polymers brominated according to the invention have melting temperatures within the range of about 400-900° F (204°-482° C). The poly(arylene sulfides) can be utilized in an uncrosslinked condition, partially crosslinked, or in a crosslinked condition according to the process of the instant invention.

The polymers prior to bromination can be partially or fully cured by heat treatment in the absence of oxygen or with an oxidizing agent either at atmospheric or superatmospheric pressure to increase the molecular weight with a lengthening of a molecular chain or by crosslinking or by a combination of both to vary the physical properties such as tensile strength and the like. Such treatment can be effected, for example, by heating the polymer preferably at an elevated temperature either above or below the melting point of the polymer, in some cases as high as 250° C (482° F) to 500° C (932° F). The heat treatment can be carried out while contacting the polymer with air under vacuum or under an inert gas such as nitrogen.

Since the poly(arylene sulfides) are essentially insoluble in the reaction medium employed for the bromination according to the instant invention, it is desirable that the polymer be present in a finely divided form such as a powder or similar finely divided material.

The bromination of poly(arylene sulfides) according to the instant invention is carried out with the use of a catalyst system which comprises a copper ion, an alkali metal ion, and a bromide ion. The copper ion can be either cuprous or cupric. The alkali metal ion can be lithium, sodium, potassium, rubidium, or cesium, although lithium presently is preferred because the lithium compounds are generally more soluble in the reaction mixture than the other alkali metal compounds. It will be readily apparent, of course, that the bromide ion component can be supplied at least in part by copper bromide, alkali metal bromides, or by a separate bromide ion source.

Any copper compound can be used that provides a source of copper ion, including such as any of the halides, oxides, carbonates, carboxylates of such as up to 18 carbon atoms per molecule, orthophosphates, sulfates, and the like, alone, or in admixture. Exemplary copper compounds include such as copper(II) acetate, copper(I) bromide, copper(II) bromide, copper(II) benzoate, copper(II) butanoate, copper(I) chloride, copper(II) chloride, copper(II) dodecanoate, copper(II) octadecanoate, copper(I) oxide, copper(II) oxide, copper(II) salicylate, copper(I) iodide, copper(I) carbonate, copper(I) sulfate, copper(II) sulfate, copper(II) orthophosphate, and the like, alone, or in admixture.

Any suitable alkali metal compound can be employed as a catalyst component in the process of the invention so long as it provides a source of alkali metal ion, including such as the halides, oxides, hydroxides, carbonates, carboxylates, orthophosphates, sulfates, and the like, alone, or in admixture similarly as described for the copper ion source. Typically, such alkali metal source compounds include such as lithium chloride, lithium bromide, lithium iodide, lithium acetate, lithium benzoate, lithium hydroxide, lithium oxide, lithium orthophosphate, lithium octadecanoate, lithium sulfate, sodium chloride, sodium bromide, sodium acetate, sodium sulfate, potassium chloride, potassium bromide, potassium acetate, potassium benzoate, potassium sulfate, rubidium chloride, rubidium bromide, rubidium acetate, rubidium sulfate, cesium chloride, cesium bromide, cesium acetate, cesium sulfate, cesium oxide, and the like, alone, or in admixture.

The catalyst system also includes a bromide ion which can, as noted above, be supplied by the copper compound or the alkali metal compound or both. Other suitable sources of bromide ion such as the alkaline earth metal bromides or other bromides whose cation is substantially inert under the reaction conditions can be employed.

In the catalyst system described above, an appropriate exemplary molar ratio of alkali metal:copper employed can be in the range of about 0.1:1 to 100:1, and preferably about 1:1 to 5:1 for best catalyst effectiveness, although the broad range should be considered exemplary and not as limitative, since the process is operable outside of the range. The molar ratio of bromide ion:copper employed in the catalyst system for exemplary purposes should be in the range of about 0.1:1 to 100:1, presently preferably about 1:1 to 5:1 for best catalyst effectiveness, though the broad range should be considered exemplary and not as limitative since the process is operable outside of the range.

The catalyst concentration employed according to the process of the invention can be conveniently expressed in terms of the amount of copper employed relative to the amount of poly(arylene sulfide) repeat unit in the polymer. Broadly, a suitable and exemplary molar ratio can range from about 0.5 to 1 millimole of copper per millimole of the poly(arylene sulfide) repeat unit, i.e.,

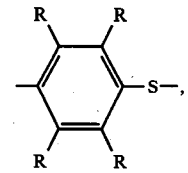

preferably the amount is from 0.1 up to 0.3 millimoles of copper per millimole of poly(arylene sulfide) repeat unit. Also, the amount of bromide ion in the catalyst system of the instant invention is broadly from 0.25 up to 10 millimoles of bromide ion per millimole of poly(arylene sulfide) repeat unit and preferably from 0.5 up to 4 millimoles of bromide ion per millimole of poly(arylene sulfide) repeat unit.

The bromination of poly(arylene sulfides) according to the instant invention with the catalyst system described above is carried out within a broad temperature range of from about 50° to about 250° C (122°-482° F), and preferably from about 125° to about 200° C (257°-392° F). The reaction time employed in the bromination reaction of the instant invention is not particularly critical and will generally depend on the temperature employed as well as the catalyst level and the extent of bromination desired in the poly(arylene sulfide). Generally, the reaction time will be from about one hour up to about 24 hours.

The bromination reaction according to the instant invention of poly(arylene sulfides) is carried out in the presence of a free oxygen-containing gas. The amount of oxygen present expressed in terms of the pressure of oxygen in the reaction zone can range from atmospheric up to 600 psig (101.3-4134 kPa) and preferably from about 50 up to about 200 psig (344.5-1378 kPa).

The bromination of the poly(arylene sulfides) according to the instant invention is carried out in the presence of a suitable diluent. Diluents which have substantial oxidative stability are utilized in the instant invention. Carboxylic acids such as acetic acid, propionic acid, and benzoic acid employed above their melting points can be utilized as diluents in the instant reaction. Other suitable diluents include sulfolane (tetrahydrothiophene-1,1-dioxide), chlorobenzene, methyl benzoate, benzonitrile, and the like. The amount of diluent is not particularly critical except, of course, it should be sufficient to provide suitable ease in stirring or otherwise handling the reaction mixture and for a suitable degree of heat transfer for the reaction. An exemplary broad range of the amount of diluent employed is from about 2 ml up to about 25 ml of diluent per gram of poly(arylene sulfide).

The bromination of poly(arylene sulfides) according to the instant invention provides a poly(arylene sulfide) in which bromine atoms have replaced hydrogen atoms principally on the aromatic ring system of the poly(arylene sulfide). However, if alkyl groups are present in the poly(arylene sulfide), some substitution of hydrogen by bromine may also take place on said alkyl groups. Furthermore, a small amount of oxidation of the sulfide linkage in the polymer may occur to produce either a sulfoxide group or a sulfone group in the polymer chain. Under the conditions utilized as described above, this type of oxidation is believed to be relatively insignificant. In addition, bromination on an alkyl group if present in the poly(arylene sulfide) or some oxidation of the sulfide group to sulfoxide or sulfone is not expected to significantly alter the properties of the brominated poly(arylene sulfide) in most applications.

The brominated poly(arylene sulfide) obtained according to the process of the instant invention can be recovered from the bromination reaction mixture by simply filtering the reaction mixture to recover the brominated poly(arylene sulfide) which is essentially insoluble in the diluent utilized for the bromination reaction. The solid brominated poly(arylene sulfide) can then be washed one or more times with water, usually warm or hot water, and additionally with organic solvents such as acetone and the like, if so desired. These washing steps, of course, are for the purpose of removing residual amounts of the catalyst system utilized for the bromination reaction and any residual diluent that may be present or residual wash solvent utilized in the washing steps can be removed by conventional drying procedures at atmospheric or reduced pressures.

The brominated poly(arylene sulfide) obtained according to the process of the instant invention is useful as a flame retardant additive for polyolefins including such as polyethylene, either low or high density forms; polypropylene; polystyrene; and copolymers of olefins such as ethylene/propylene copolymers, and the like. It is known to use poly(arylene sulfides) as ultraviolet stabilizers for polyolefin compositions when employed in amounts of about 1 to about 10 parts by weight of poly(arylene sulfide) and about 99 to 90 parts by weight of a polyolefin. In view of this knowledge, it is believed that the brominated poly(arylene sulfides) obtained according to the instant invention can provide both flame retardant behavior as well as ultraviolet stabilization on polyolefin compositions containing these materials.

EXAMPLE I

A 250 ml Fisher-Porter aerosol compatibility bottle equipped with magnetic stirring means was charged with 6.5 grams (75 millimoles) of lithium bromide, 4.8 grams (24 millimoles) of cupric acetate monohydrate, 50 ml of acetic acid, 25 ml of acetic anhydride, and 11.1 grams (0.1 mole equivalent) of an uncured poly(phenylene sulfide) powder having a melt flow of about 6,000 as determined by the previously described modified ASTM-D-1238 method. The reaction bottle was placed in an oil bath, pressured to 30 psig (206.7 kPa) with oxygen, and heated to 140° C (284° F). About 45 minutes was required to reach the reaction temperature, and the reaction was continued for about four hours with repressuring the vessel to about 80 to 100 psig (551.2 to 689 kPa) with oxygen at about 15 to 25 minute intervals. It was calculated that about 0.092 moles of oxygen was consumed during the reaction. The reaction bottle was vented, and the product was collected on a sintered glass funnel and washed with acetic acid until the washing liquid was colorless. The solid material was then thoroughly washed with water, with methanol, and finally with acetone. The recovered product was dried in the air to a weight of 14.1 grams. Infrared analysis of the recovered polymer showed that very little, if any, oxidation of the sulfide group to sulfoxide or sulfone had occurred. Analysis of the polymer sample for bromine content found 9.68% and 9.72% in two determinations. It was calculated that one bromine per repeat unit of the poly(phenylene sulfide) would have given a bromine content of 40.61%; thus, the values shown above correspond to about one bromine atom per 4.18 repeat units in the brominated poly(phenylene sulfide).

The above result demonstrates operability for the instant invention in providing a bromination sytem for poly(arylene sulfides).

EXAMPLE II

Another run was conducted by charging a 250 ml Fisher-Porter aerosol compatibility bottle equipped with a magnetic stirrer with 6.5 grams (75 millimoles) of lithium bromide, 9.6 grams (48 millimoles) of cupric acetate monohydrate, 50 ml of acetic acid, 25 ml of acetic anhydride, and two ¾ inch × ¼ inch pieces (weight 1.3 grams) of a molded poly(phenylene sulfide) material previously utilized in a tensile strength test. The material was molded from an unfilled poly(phenylene sulfide) which had a melt flow of about 35. The reaction bottle was placed in an oil bath and pressured to 30 psig (206.7 kPa gage) with oxygen and heated to 140° C (284° F). About one hour and ten minutes was required to reach the reaction temperature and the reaction was then continued for four hours with intermittent repressuring of the reaction bottle to 100 psig (689 kPa gage) at about 15 to 25 minute intervals. However, after about two hours into the reaction period, essentially no more oxygen uptake appeared to occur. At the end of the reaction period, the bottle was vented and the poly(phenylene sulfide) slabs were recovered, washed with water, and air dried. Weight of the dried poly(phenylene sulfide) slabs indicated no weight change had taken place during the reaction. Infrared analysis of a ground-up portion of the treated poly(phenylene sulfide) showed that some oxidation had occurred but was not very extensive. Analysis of the treated polymer slabs for bromine content was not carried out. It is believed that very little bromination or oxidation of the sulfide group in the polymer had occurred under the conditions described. This result indicates the desirability of utilizing the poly(arylene sulfide) polymer in a finely divided form such as the powdered form utilized in Example I above.

EXAMPLE III

Several other runs were conducted which were outside the scope of the instant invention in which a poly(phenylene sulfide) was treated with various catalyst systems under oxidizing conditions in an attempt to provide oxidation of the sulfide group to sulfoxide or sulfone groups in the polymer. These runs were not successful in providing the oxidation of the sulfide group. However, these runs did not employ a source of bromide ion in the reaction system, and thus no bromination of the poly(phenylene sulfide) was achieved. In one run an oxidation catalyst of cupric acetate and lithium nitrate was employed in the presence of acetic acid and acetic anhydride as a diluent for the oxidation of poly(phenylene sulfide). In this run, there was observed at about 110° C (230° F) a sudden pressure increase in the reaction zone and copious amounts of $NO_2$ fumes were formed. The reaction was immediately shut down. This result indicates that caution should be observed when nitrate salts are present with other materials under the typical oxidation conditions.

We claim:

1. A process for the bromination of poly(arylene sulfides) which comprises contacting (a) an arylene sulfide polymer in finely divided form having the repeating unit

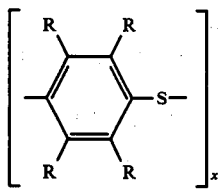

wherein R is hydrogen or an alkyl group having from 1 to 4 carbon atoms and $x$ is an integer ranging from about 10 to about 250 with (b) a free oxygen-containing gas in the presence of (c) a catalytically effective amount of a catalyst system comprising a copper ion, an alkali metal ion, and a bromide ion under reaction conditions including a temperature, a period of time, and ratios of reactants sufficient to form the brominated arylene sulfide polymer.

2. A process according to claim 1 wherein said effective catalyst ratios are represented by a molar ratio of alkali metal:copper ion in the range of about 0.1:1 to 100:1, a molar ratio of bromide ion:copper ion in the range of about 0.1:1 to 100:1, and a molar ratio of copper to poly(arylene sulfide) of 0.05 to 1 millimole of copper per millimole of polymer repeating unit.

3. The process according to claim 1 wherein said polymer is poly(phenylene sulfide), the temperature is in the range of about 50 to about 250° C (122°-482° F), the amount of oxygen present expressed in terms of the pressure of oxygen in the reaction zone, ranges from atmospheric to about 600 psig (101.3-4134 kPa gage), and said contacting is carried out in a diluent having substantial oxidative stability.

4. A process according to claim 3 wherein said copper ion is supplied by cupric acetate, said alkali metal ion is lithium bromide, and said diluent is acetic acid.

5. A process according to claim 1 wherein said polymer is poly(phenylene sulfide).

6. The process according to claim 1 wherein said copper ion is cuprous or cupric and is supplied by a copper compound selected from the group consisting of copper halides, oxides, hydroxides, carbonates, sulfates, orthophosphates, and hydrocarbon carboxylates.

7. The process according to claim 1 wherein said alkali metal ion is selected from the group consisting of lithium, sodium, potassium, rubidium, and cesium, and said alkali metal ion is suppled by an alkali metal compound selected from the group consisting of alkali metal halides, oxides, hydroxides, hydrocarbon carboxylates, sulfates, and orthophosphates.

8. The process according to claim 1 wherein the alkali metal:copper ion molar ratio ranges from 1:1 to 5:1, the bromide:copper ion molar ratio ranges from 1:1 to 5:1, the molar ratio of copper:polymer ranges from 0.1 to 0.3 millimole of copper per millimole of polymer, the temperature of contacting is in the range of about 125° to about 200° C (257°-392° F), the amount of oxygen present ranges from about 50 to about 200 psig (344.5-1378 kPa gage), and the contacting is carried out in the presence of a diluent in an amount ranging from about 2 ml to about 25 ml of diluent per gram of polymer.

* * * * *